Oct. 8, 1957     H. MUCZENSKI ET AL     2,809,307

DYNAMOELECTRIC MACHINE

Filed April 19, 1955     3 Sheets-Sheet 1

WITNESSES

INVENTORS
Henry Muczenski &
James H. Penney
BY
ATTORNEY

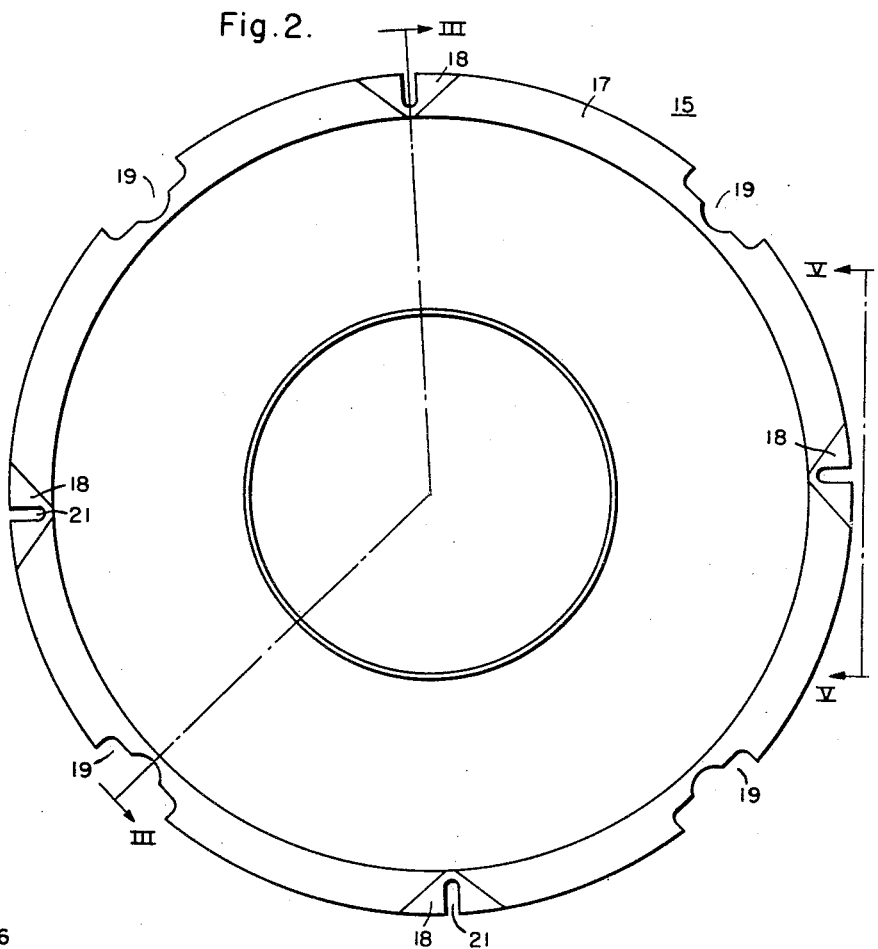
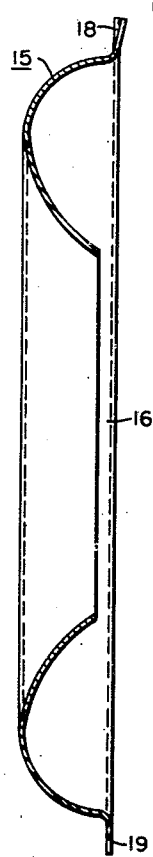
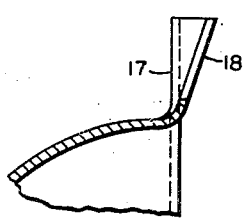
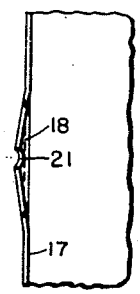

United States Patent Office 2,809,307
Patented Oct. 8, 1957

2,809,307

DYNAMOELECTRIC MACHINE

Henry Muczenski, West Seneca Township, Erie County, and James H. Penney, East Amherst, N. Y., assignors to Westinghouse Electric Corporation, East Pittsburgh, Pa., a corporation of Pennsylvania Application April 19, 1955, Serial No. 502,280

7 Claims. (Cl. 310—60)

Our invention relates, generally, to dynamoelectric machines, and, more particularly, to air shields for directing the flow of ventilating air in such machines.

The rotor of a modern dynamoelectric machine is usually provided with a fan for circulating ventilating air through the machine. An air shield is also usually provided adjacent the fan to direct the air to the fan and over the windings of the machine in a desired path to obtain the maximum cooling effect. In order to be most effective, the air shield must be mounted in the proper position relative to the fan.

Dynamoelectric machines of different power ratings are designed and manufactured with frames having the same physical dimensions. This practice involves the utilization of stator cores and rotor members of different axial lengths to obtain the desired ratings. When an air shield is mounted on the end bracket or frame of a machine, its axial position with respect to the frame must be different for rotors of different lengths in order to be in the correct position with respect to the fan which is carried on the rotor.

At one time, it was the practice to provide a number of air shields of different designs for utilization in the same motor frame with different rotor members. This practice made it necessary to manufacture and stock a number of air shields of different designs for each standard frame size, thereby causing an undesirable expense.

In a copending application of J. H. Penney, Serial No. 416,749, filed March 17, 1954, now Patent No. 2,798,974, there is disclosed a dynamoelectric machine having an air shield provided with a plurality of mounting means so disposed in different planes that the shield can be mounted in different axial positions with respect to the stator of the machine, thereby permitting the same shield to be utilized with rotors of different lengths.

An object of our invention is to provide an improved air shield of the type disclosed in the aforesaid copending application.

Another object of our invention is to provide an air shield which may be manufactured inexpensively and readily installed in a dynamoelectric machine.

A further object of our invention is to provide for readily mounting an air shield in different axial positions in a dynamoelectric machine.

Still another object of our invention is to provide for retaining an air shield in position in a dynamoelectric machine by the mounting means for an end bracket of the machine.

Other objects of our invention will be explained fully hereinafter or will be apparent to those skilled in the art.

In accordance with one embodiment of our invention, four equally spaced notches and four equally spaced generally V-shaped crimps are provided in a peripheral flange on an annular sheet metal air shield. The notches and the crimps are spaced approximately 45° from each other. Four equally spaced bosses are provided on the inside of one end bracket for a motor. The bosses are spaced 45° from the holes for the mounting bolts which hold the end bracket on the motor frame. A plurality of grooves are provided in the bosses to locate the shield at different axial positions. The shield may be installed by aligning the notches in the shield with the bosses on the bracket and inserting the shield into the bracket. When the correct axial position of the shield is reached, the shield is rotated approximately 45° until the crimped portions are forced into place in the grooves in the bosses. The notches in the shield are now in alignment with the holes for the bracket mounting bolts which may be installed to hold the bracket on the frame and prevent rotation of the air shield.

For a better understanding of the nature and objects of the invention, reference may be had to the following detailed description, taken in conjunction with the accompanying drawings, in which:

Fig. 2 is a view, in elevation, of an air shield utilized in the machine shown in Fig. 1;

Fig. 3 is a view, in section, taken along the line III—III in Fig. 2;

Fig. 4 is an enlarged portion of the sectional view shown in Fig. 3;

Fig. 5 is a fragmentary side view of the air shield, as indicated by the arrows V—V in Fig. 2;

Figure 1:
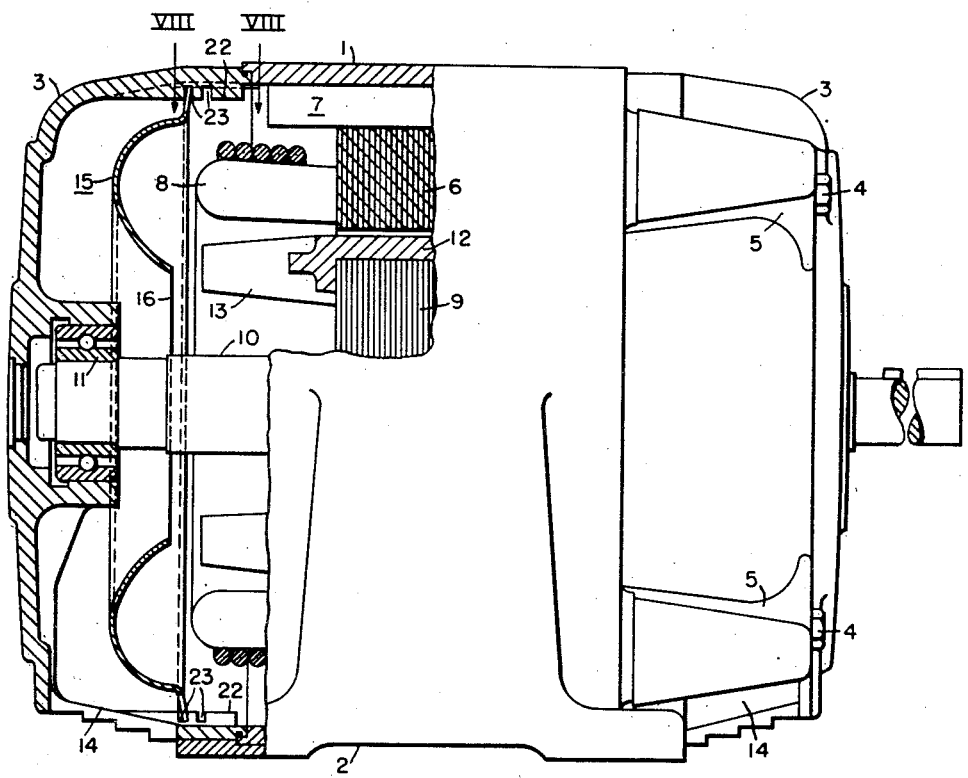
Figure 1 is a view, partly in elevation and partly in section, of a dynamoelectric machine embodying the principal features of the invention.

The present invention may be utilized in dynamoelectric machines of any size or type. For purpose of illustration, it is shown as applied to an alternating-current induction motor. The motor shown in Fig. 1 of the present drawings comprises a generally cylindrical frame 1 which is provided with supporting feet 2 and is closed at the ends by end brackets 3. The end brackets 3 may be of similar construction and are secured to the frame 1 by means of bolts 4 which pass through mounting lugs 5 of any suitable type.

A laminated stator core 6 is supported in the frame 1. The core 6 may be pressed into the frame on longitudinal ribs 7 having axial spaces between them for the circulation of ventilating air. Primary windings 8 of any suitable type are mounted on the stator core 6. A rotor member includes a laminated core 9 mounted on a shaft 10. The shaft 10 is supported by bearings 11 disposed in the end brackets 3. A secondary winding 12, which may be of the squirrel cage type, is carried on the rotor core 9. In the present structure, fan blades 13 are formed integrally with the winding 12 for circulating ventilating air through the motor. If desired, a separate fan structure may be mounted on the shaft 10 in place of the integral fan blades 13.

The motor is ventilated by air entering and leaving through ventilating openings 14 in the end brackets 3. An air shield or baffle 15 may be mounted in one end bracket of the motor to direct the air in the desired manner. The air shield 15 may be of any desired type and, in the present instance, is shown as being an annular sheet metal shield having a central opening 16 for directing the incoming air into the fan blades 13. As shown in the drawing, the shield is formed to direct air discharged from the fan over the end turns of the winding 8 and into the axial passages between the ribs 7.

As explained hereinbefore, the air shield 15 must be positioned in the correct axial location with respect to the fan blades 13 and the stator windings 8 in order to be fully effective for its intended purpose. If rotors and stator-cores of different lengths are utilized in frame structures having the same dimensions, the axial position of the air shield relative to the frame must be changed accordingly. As also previously explained, an early practice was to provide a number of different designs of air shields for use with a given frame size in order to obtain the desired results. As described in the aforesaid copending application, one air shield was so designed that it could be mounted on a plurality of different axial positions for use with different rotors, thereby eliminating the necessity for several different designs of air shields.

The present invention provides for mounting a simplified and improved air shield in a plurality of different axial positions in a dynamoelectric machine. As shown most clearly in Figs. 2 to 5, inclusive, a peripheral flange 17 of the air shield 15 has four equally spaced, generally V-shaped crimps 18 provided therein. The flange 17 also has four equally spaced notches 19 therein. As shown in Fig. 2, the center lines through the crimps 18 are offset slightly from the center lines through the notches 19 for a purpose which will be explained more fully hereinafter. The crimps 18 may be formed by providing notches 21 in the flange 17 and then pressing the portions of the flange adjacent the notches 21 to the positions shown most clearly in Figs. 4 and 5.

Figure 6:
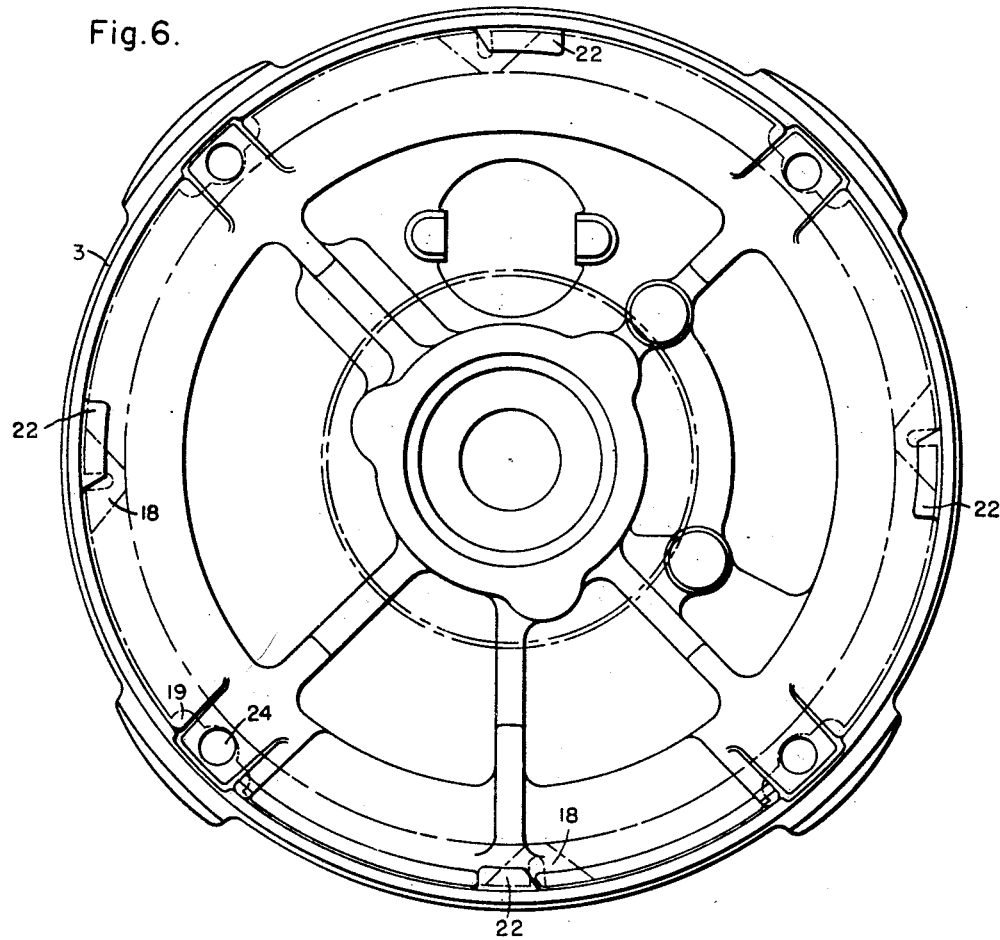
Fig. 6 is a view, in end elevation, of an end bracket for the machine shown in Fig. 1.

As shown in Fig. 6, four equally spaced bosses 22 are provided in the end bracket 3. As shown in Fig. 1, a plurality of spaced grooves 23 are provided in the bosses 22. The grooves 23 may be machined in the bosses 22, and they are so located as to properly position the air shield 15 for rotors and stator windings of different lengths which may be utilized in the same motor frame. It will be understood that more than two grooves 23 may be provided, if desired.

Figure 8:
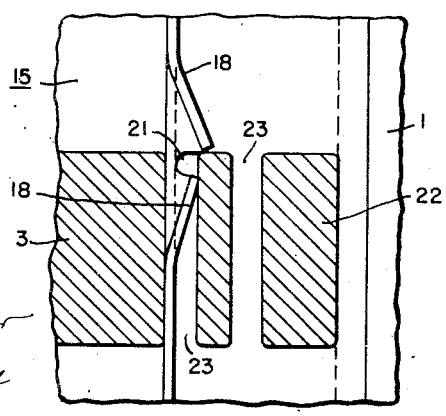
Fig. 8 is a fragmentary view, in section, taken along the line VIII—VIII in Fig. 1.

The air shield 15 may be assembled in the bracket by laying the bracket on a workbench and placing the air shield in the bracket with the notches 19 spanning the bosses 22 in the bracket. When the flange 17 on the air shield is aligned with the groove 23 which provides the correct axial position of the shield for the particular rotor and stator windings in the motor frame, the shield is rotated approximately 45° until the crimped portions of the shield enter the groove 23 in the bosses 22. As shown most clearly in Fig. 8, the V-shaped crimps 18 act as a stop when rotating the shield during the assembly operation. Since the width of the groove 23 is less than the height of the crimped portions, one side of the crimp is depressed when it enters the groove while the other side stays at full height and engages the side of the boss 22, thereby positioning the shield. This facilitates the assembly as the shield is automatically stopped in the correct radial position.

Figure 7:
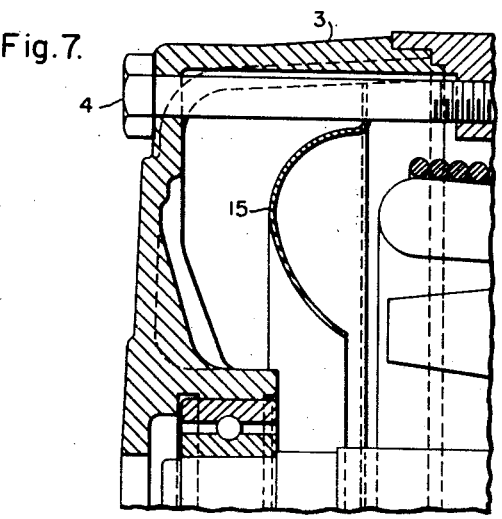
Fig. 7 is an enlarged sectional view of a portion of the structure shown in Fig. 1, the section being taken in a plane through one of the mounting bolts for the end bracket.

As shown by the broken lines in Fig. 6, the crimped portions 18 are so offset with respect to the notches 19 that substantially half of each crimped portion is disposed in the groove 23 when the notches 19 are in alignment with openings 24 provided in the end bracket for the mounting bolts 4. Thus, when the bolts 4 are inserted to attach the end bracket to the frame 1, as shown in Fig. 7, the shield 15 is prevented by the bolts 4 from rotating. In this manner, the shield 15 is securely held in position. The crimped portions of the flange, which are disposed in the grooves 23, prevent axial movement of the shield, and the bolts 4, which are disposed in the notches 19, prevent rotation of the shield.

From the foregoing description, it will be apparent that the present structure has numerous advantages over prior structures. The air shield is more simple and inexpensive than prior air shields. The grooves 23 may be machined in the end bracket at the same time that other machining operations are being performed. Since no separate drilling operations are required, the cost of the end bracket is reduced. The assembly of the end bracket and the air shield is more simple and less time-consuming than prior methods. The air shield cannot accidentally come out of its proper position because the bracket mounting bolts permit no rotation of the shield, and the grooves in the end bracket permit no axial movement of the shield. Accordingly, we have provided an air shield and a manner of mounting the shield in a dynamoelectric machine, which are an improvement over prior shields and mounting methods.

Since numerous changes may be made in the above-described construction and different embodiments of the invention may be made without departing from the spirit and scope thereof, it is intended that all matter contained in the foregoing description or shown in the accompanying drawings shall be interpreted as illustrative and not in a limiting sense.

We claim as our invention:

1. In a dynamoelectric machine having a stator member and a rotor member, fan means on the rotor member for circulating ventilating air, a generally annular air shield for directing said air, a plurality of axially spaced mounting means in the stator member for selectively mounting the air shield at different axial positions, and means on the air shield for frictionally engaging said mounting means to retain the shield in position when it is rotated a predetermined distance.

2. In a dynamoelectric machine having a stator member and a rotor member, fan means on the rotor member for circulating ventilating air, a generally annular air shield for directing said air, a plurality of axially spaced mounting means in the stator member for selectively mounting the air shield at different axial positions, and means disposed around the periphery of the air shield for frictionally engaging said mounting means to retain the shield in position when it is rotated a predetermined distance.

3. In a dynamoelectric machine having a stator member and a rotor member, fan means on the rotor member for circulating ventilating air, a generally annular air shield for directing said air, a plurality of axially spaced mounting means in the stator member for selectively mounting the air shield at different axial positions, integrally formed means disposed at spaced intervals around the periphery of the air shield for frictionally engaging said mounting means when the shield is rotated a predetermined distance, and stop means on the shield for engaging said mounting means to limit the rotation of the shield.

4. In a dynamoelectric machine having a stator member and a rotor member, fan means on the rotor member for circulating ventilating air, a generally annular air shield for directing said air, a plurality of angularly spaced bosses in the stator member, a plurality of axially spaced grooves in said bosses for selectively mounting the air shield at different axial positions, means on the air shield for frictionally engaging the sides of said grooves when the shield is rotated a predetermined distance, and stop means on the shield for engaging said bosses to limit the rotation of said shield.

5. In a dynamoelectric machine having a stator member and a rotor member, fan means on the rotor member for circulating ventilating air, a generally annular air shield for directing said air, a plurality of angularly spaced bosses in the stator member, a plurality of axially spaced grooves in said bosses for selectively mounting the air shield at different axial positions, and integrally formed means disposed at spaced intervals around the periphery of the air shield for frictionally engaging the sides of said grooves to retain the shield in position when it is rotated a predetermined distance.

6. In a dynamoelectric machine having a stator member and a rotor member, fan means on the rotor member for circulating ventilating air, said stator member including a frame member and a removable end bracket at each end of the frame, at least one of said brackets having a plurality of angularly spaced bosses therein, a plurality of axially spaced grooves in said bosses, a generally annular air shield having a peripheral flange thereon, projecting means on said flange for selectively entering said grooves and frictionally engaging the sides of said grooves when the shield is rotated a predetermined distance, and bolts for attaching said end bracket to said frame, said bolts engaging said flange to prevent further rotation of said air shield.

7. In a dynamoelectric machine having a stator member and a rotor member, fan means on the rotor member for circulating ventilating air, said stator member including a frame member and a removable end bracket at each end of the frame, at least one of said brackets having a plurality of angularly spaced bosses therein, a plurality of axially spaced grooves in said bosses, a generally annular air shield having a peripheral flange thereon, a plurality of angularly spaced notches on said flange for receiving said bosses, a plurality of angularly spaced integrally formed projections on said flange for selectively entering said grooves and frictionally engaging the sides of the grooves when the shield is rotated a predetermined distance, and bolts for attaching said end bracket to said frame, said bolts passing through said notches after the shield has been rotated said predetermined distance, thereby preventing further rotation of said shield.

References Cited in the file of this patent

UNITED STATES PATENTS

| 2,394,414 | Wightman | Feb. 5, 1946 |
| 2,429,903 | Trickey | Oct. 28, 1947 |
| 2,542,016 | Else | Feb. 20, 1951 |

FOREIGN PATENTS

| 341,164 | Great Britain | Jan. 15, 1931 |